July 1, 1969  D. BEGGS  3,452,972
FURNACE HEARTH
Filed June 23, 1966  Sheet 1 of 2

United States Patent Office 3,452,972
Patented July 1, 1969

3,452,972
FURNACE HEARTH
Donald Beggs, 4235 Talwood Lane,
Toledo, Ohio 43606
Continuation-in-part of application Ser. No. 472,948,
July 19, 1965. This application June 23, 1966, Ser.
No. 565,666
Int. Cl. F27b *21/00;* F27d *1/16, 3/12*
U.S. Cl. 266—20                    13 Claims

ABSTRACT OF THE DISCLOSURE

This disclosure concerns a refractory furnace hearth having wustite (FeO) as a constituent thereof and the method of making such a refractory hearth. The subject furnace hearth has particular utility in the processing of iron oxide containing material, and is able to support such material during the reduction thereof without being destroyed during the process.

---

This application is a continuation-in-part of U.S. patent application Ser. No. 472,948, filed July 19, 1965, now co-pending, the benefit of said filing date being claimed herewith.

This invention relates to the furnace art—more particularly, to improved hearth structures for rotary hearth furnaces. The invention is concerned with the provision of a hearth structure (or, of a surfacing layer for a hearth structure) which is operable in a furnace the atmosphere of which is in equilibrium with ferrous oxide, FeO. In practical terms, the invention is directed to a surfacing layer for the rotary hearth of a furnace in which a ferruginous material is being processed, the furnace conditions within which furnace causes at least a part of the iron content of the material reaching the hearth to react to or to be in the FeO state, otherwise known as the wustite state.

In United States Patent No. 2,793,109 to Huebler and Beggs there is disclosed a process of reducing iron oxide to metallic iron involving application or patentee's "heat-fast" metallizing techology. In this process pellets (or equivalent relatively small, compacted, bodies) of a homogeneous mixture of finely divided iron ore concentrate (or equivalent material rich in iron oxide) and a powdered coal or other carbonaceous material are rapidly heated in an atmosphere oxidizing to metallic iron but substantially devoid of free oxygen. By reason of the rapid heating, the gases which issue from the pellets during the reduction reaction serve to protect metallic iron being formed in the pellets from the oxidizing effects of the furnace atmosphere gases. Thus, as described in the Huebler-Beggs patent, it is possible to accomplish direct reduction of iron oxide to metallic iron in an atmosphere which is oxidizing to metallic iron. To employ this "heat-fast" technology to best advantage, it is necessary to establish very high rates of heat transfer from the furnace environment to the pellets being treated. In effect, this means relatively high furnace temperature, e.g., temperatures of at least 2200° F. and preferably of the order of 2500 to 2600° F. The pellets themselves, during heat-fast metallizing, reach a final temperature of the order of 2200 to 2300° F.

Although some forms of iron oxide such as mill scale and oxygen blown steel furnace fume are relatively free of silica, most iron ore materials and iron ore concentrates are a mixture of iron oxide and silica, together with small amounts of other oxides or carbonates. The iron oxide in such materials is generally in the form of hematite ($Fe_2O_3$) or a mixture of hematite and magnetite ($Fe_3O_4$). In the process of reducing either of these oxides to metallic iron each goes through the stage of wustite (FeO).

Wustite and silica will combine to form a liquid eutectic at a temperature of about 2150° F., the percentage of initial liquid depending on the relative amount of silica present. In mixtures rich in iron oxide, as the temperature is increased above 2150° F., the percentage of liquid increases. In the case of a relatively high purity form of iron oxide such as mill scale which is essentially non-silicious, such oxide when reduced to wustite becomes liquid at a temperature of about 2500° F. As wustite in such latter form of iron oxide can find silica with which to react, the melting point will be lowered below 2500° F. and some liquid will form at the eutectic melting temperature of about 2150° F.

At the high temperature involved in "heat-fast" metilizing, wustite tends to react with and ultimately structurally destroy all known conventional furnace refractories. Wustite at these temperatures is often referred to by ceramic engineers as an almost "universal solvent" to refractories. Wustite and silica are even more reactive and destructive. However, at temperatures below that which wustite reacts to form a liquidus phase, wustite is relatively non-reactive with such furnace refractories, since the liquids phase is absent.

When "heat-fast" metallizing in a direct fired furnace, the furnace atmosphere gases are oxidizing to metallic iron. When pellets are metallized as a relatively thin layer on a hearth which is subjected to high temperature radiant heat from a furnace enclosure—which is the preferred procedure for carrying out the process—the hearth surface is sensitive to the effect of the furnace atmosphere gases as well as the effect of reducing gases issuing from the pellets. The net effect is that the gases at the hearth surface are generally in equilibrium with iron oxide in the wustite state. Thus, any iron oxide particles, such as fines or chips from the pellets, which get onto the surface of the hearth, are reacted to wustite. Since the furnace temperature required for best employment of heat-fast metallizing is in the range 2500 to 2600° F., and the pellets are heated to a temperature of 2200 to 2300° F., the hearth surface reaches a temperature well above 2150° F., which is the temperature at which wustite will react with silica to start forming a liquid. When such metallizing is attempted on a conventional refractory hearth, the liquid phase soaks into the hearth and very quickly destroys the refractory by causing it to shear off in progressive layers. It has been found by experiment that even a basic refractory high in magnesium oixde, which is one of the most resistant of the furnace refractories to the action of wustite, is quickly destroyed. The result is a progressively thinner and more irregular hearth surface which makes the carrying out of metallizing a relatively thin layer of pellets completely impractical. In a specific continuous laboratory rotary hearth furnace, during metallizing operation approximately ¼ inch of high magnesium oxide hearth refractory, which is considered by ceramic engineers as one of the best known refractory materials for this sort of service, was destroyed every three to four hours. Continued running of the furnace under metallizing conditions made the hearth completely unusable in a very short period of time. In practical terms, it was found necessary to put in a new refractory hearth practically every time a metallizing run was made, so that, in effect, a run would last for about one day, and the next ten days would be spent rebuilding the hearth.

In the process of destroying a plurality of such hearths, each composed of a somewhat different basic refractory, e.g., magnesite and magnesite-chrome, a good opportunity to observe the mechanism of destruction was afforded. As the "green" pellets are fed onto the hearth of the furnace, a certain amount of fines or chips get onto the hearth. This is a situation which will exist when dealing with relatively fragile "green" pellets or compacts of finely divided iron oxide particles. During the pellet metallizing cycle, the fines react to wustite since loose fines do not protect themselves from the products of combustion atmosphere in the furnace. Since there is some silica either in the refractory hearth material or present with the wustite, and since the fines reach a temperature higher than 2150° F. toward the end of the metallizing cycle, some liquid is formed during the latter stages of metallizing of the pellets. This liquid seeps into and reacts with the refractory surface of the hearth. As the hearth rotates past the region of removal of the metallized pellets to the region where the relatively cool "green" pellets are fed onto the hearth, the surface of the hearth is rapidly chilled by the cool "green" pellets to a temperature well below the solidification temperature of the liquid. As the metallizing cycle of the "green" pellets progresses, the surface of the hearth again liquifies. Thus, with every revolution of the hearth, which is nominally eight to ten minutes, the liquid phase alternately liquifies and solidifies.

When a material which contains wustite or wustite and silica becomes liquid or semi-liquid and is then solidified, the resultant structure is very dense vitrified material with a thermal expansion coefficient which does not match that of conventional furnace hearth refractory materials. As the vitrified material works its way into the refactory hearth, it physically shears off as a vitrified layer when it "grows" to be about 1/8" to 1/4" thick. As this layer shears off, the surface of the hearth becomes very irregular. The wustite again reacts with and attacks the exposed refractory surface until within a short period of time another layer will shear off. The destructive action might be described as first a chemical reaction, together with a liquid permeation, followed by a physical separation of two dissimilar materials as the surface region of the hearth is progressively heated and chilled.

In attacking the problem created by the formation of liquid on the surface of the hearth during the heat-fast metallizing process, a thermal analysis was made, with the following findings. The surface of the hearth is at a temperature of about 2200° F. to 2300° F. at the end of the metallizing cycle. After the metallized pellets are removed and the cool "green" pellets are fed onto the hearth, the surface is chilled by the cool "green" pellets to a temperature of about 1200° F. to 1600° F. for a brief period. As the metallizing cycle progresses, the hearth surface rapidly reheats. When the probable time-temperature cycle of the hearth surface was integrated, the analysis indicated that the temperature swing one inch below the hearth surface was probably from 2000° F. to 2100° F., and two inches below the surface the temperature was probably quite stable at about 2050° F. This analysis was based on a time cycle of ten minutes per revolution of the hearth, which accounts for the indicated relatively stable temperature condition two inches below the hearth surface.

Thermal analysis having indicated that the major portion of the top two inches of a hearth ought to be below the 2150° F. liquidus temperature of wustite and silica eutectic, and since wustite in the absence of liquid phase does not react at any appreciable rate with furnace refractories, it was conceived that it ought to be possible to construct a hearth consisting of conventional refractory materials as a sub-base and topped off with a layer, say one to two inches thick, or vitrified wustite or wustite and silica material. Such vitrified slab, it was reasoned, ought not to develop shear planes as build-up of additional wustite-containing fines become attached to the hearth surface, since the thermal expansion coefficient of the vitrified fines' build-up would be compatible with that of the vitrified slab. This concept was developed in the following manner.

A hearth sub-structure was constructed consisting of a six-inch bottom layer of insulating castable fireclay refractory, followed by a four-inch layer of hard fireclay castable refractory, followed by a two-inch thick layer of a 95% magnesium oxide castable refractory. The top surface of the latter layer of refractory was two inches below the elevation of the desired eventual hearth operating surface elevation. This allowed room for the build-up of a two-inch thick slab of vitrified wustite or wustite and silica material.

For the formation of this two-inch thick layer a magnetite concentrate which contained about 4% silica was used as raw material. To this magnetite concentrate, about 5% by weight of Pocahontas coal fines were added and thoroughly admixed. The purpose in adding this amount of coal was to provide a reductant which would react at high temperature to quickly reduce the magnetite to wustite. It of course will be appreciated that the furnace atmosphere gases, instead of the coal addition, could have been utilized for the reduction to wustite.

The laboratory rotary hearth furnace was fired up, and the temperature in the metallizing zones was set at about 2500° F. The burners were adjusted so that the products of combustion atmosphere would contain about 10% combustibles (CO plus hydrogen), which composition established an equilibrium condition in the furnace gases which was in equilibrium with wustite. The hearth rotation speed was set for about one hour per revolution, and then onto the hearth there was fed a two-inch thick layer of the above concentrate-coal mixture and the layer was leveled off at the point of application by means of a helical screw which removed any excess. As the hearth slowly rotated through the high temperature zones, the two-inch thick layer of concentrate-coal mixture became heated to a temperature well above the eutectic liquidus point of wustite and silica. Since the concentrate contained only enough coal to reduce the magnetite to wustite, and since the furnace combustion gases were also in equilibrium with wustite, the magnetite become converted to wustite by the time the mixture reach 2150° F. As liquid started to form, the initial two-inch thick layer of powder slowly shrank and eventually became a shimmering lake of liquid about one-half inch deep on top of the MgO refractory. Although this concentrate contained only about 4% silica, which would enable the formation of only a relatively small amount of initial liquid at 2150° F., wustite containing this much silica becomes 100% liquid at about 2500° F. This was the reason for operation at 2500° F. in order to completely vitrify and thus densify the concentrate.

In this regard, a non-silicious form of iron oxide such as mill scale could have been used instead of the magnetite concentrate, by raising the furnace temperature to about 2550° F. to liquify wustite without the presence of silica. This has been tried out with the resultant formation of a dense vitrified slab of wustite with a liquidus point of about 2500° F.

As the hearth slowly rotated from the 2500° F. zones and back to the point of application of the cool powdered concentrate-coal mixture, the liquid phase of course solidified. Another layer of concentrate-coal mixture was then added and brought up to elevation with the leveling screw. This layer also liquified and sharnk, the composite now providing close to a one-inch thick vitrified layer. After about six successive revolutions of the hearth a layer, substantially two inches thick, of vitrified material, had formed.

A two-inch thick monolithic slab of vitrified wustite material had thus been formed on the sub-structure of the hearth. The hearth was rotatable. Shrinkage cracks did not develop in the slab as the hearth moved into a relatively cool region where the "green" pellets are normally fed onto the hearth.

A four-hour metallizing run was then made. At the end of this run the hearth was about 1/8" thicker, due to a small amount of fines and chips progressively getting onto the hearth and vitrifying to the two-inch thick slab. Actually this build-up amounted to only about 1% of the total amount of pellet feed. The metallizing run was very successful. There was no noticeable tendency for the pellets to sink into the surface of the slab, indicating that the aforesaid thermal analysis had been correct in that the body of the two-inch thick slab remained in a substantially solidified state during the metallizing operation. The next problem consisted in ascertaining how this build-up could be doctored off during the conduct of a metallizing operation.

Utilizing the helical screw which had been used to level the concentrate-coal mixture when the latter was put onto the hearth, the screw was slowly brought into contact with the hearth surface. In approximate terms, it was found that when the temperature of the surface of the hearth was below about 2000° F., the screw simply bounced on the hearth surface, showing that the hearth surface was exceedingly hard. It could not be milled. However, when the surface temperature of the hearth was maintained at about 2000° F. to 2100° F. at the region of the screw, it was found that the surface could be milled as though it were cold butter. The 1/8″ of build-up was then milled off, and the result was a hearth surface which looked about as flat as a pool table.

Another four-hour metallizing run was then made, and it was found that any build-up could be continuously milled off, indicating that the surface of the hearth as it reached the screw was at a temperature of at least the order of 2000° F. As insurance that it could be arranged to have the surface of the hearth hot enough to mill at the region of the milling screw during normal metallizing operation, a ported burner tube was installed between the point of removal of the metallized pellets and the milling screw. When the ported burner tube, which impinged hot gases onto the surface of the hearth, was turned on, it was found that the milling was easier. Whether or not this ported heating tube or equivalent hearth surface heating device is needed depends on the relative heat-conserving efficiency of the particular rotary hearth furnace and on the type of iron oxide material being processed.

After a number of additional metallizing runs, the furnace was shut down and cooled in order that the vitrified hearth slab could be examined. When the furnace was cold, the slab was seen to have developed small cracks about 12 inches to 18 inches apart, very much as would be observed in cooling down a conventional castable refractory material. The two-inch layer was sheared loose from the magnesium oxide refractory sub-base, this shearing action having occurred during cooling down, since the thermal expansion coefficient of the slab of vitrified wustite material was not compatible with that of the magnesium oxide refractory. The two-inch thick cracked slabs were simply lifted off and there were then made a number of investigations of the nature of the vitrified material which had been manufactured.

The vitrified material is very hard but brittle. It requires a diamond cutting wheel in order to effectively saw it. The density is about 300 pounds per cubic foot, which is nearly two-thirds as heavy as steel. The thermal expansion coefficient of the vitrified material was determined and found to be somewhat greater than that of most refractory materials. Laboratory analysis confirmed that the slab consisted essentially of a vitrified wustite with some silica material. The thermal conductivity was found to be of the same order of magnitude as that of a dense firebrick.

The hot subsidence properties of the vitrified material were investigated and it was found that the material is quite strong in compression up to about 2000° F. and then becomes somewhat plastic up to about 2150 to 2200° F. at which point some liquid is formed and the material becomes soft. Above 2150° F., it might be a reasonable analogy to liken the material to a paint. As the wustite and silica material liquifies, it becomes the vehicle the solidified fraction being like a pigment. Thus, as the percent liquid increases the consistency becomes progressively thinner. It appears as though it is quite a substantial material even at 2200° F., thus the pellets do not sink into the hearth as they are metallized.

In vitrifying various iron ore concentrates, it was found that the fluidity varies with the silica concentration. Some concentrates contain as much as 8% silica, and when such a concentrate is vitrified it is much more fluid at a given temperature than is a 4% silica concentrate. To reduce the fluidity at a given temperature, one can add dolomite or magnesia or similar basic material to the mixture prior to liquifying and vitrifying. It may be desirable, when making a hearth slab, to deliberately add a small amount of silica when using a concentrate which is exceedingly low in silica to increase fluidity for ease of vitrification, and, on the other hand, to add some stiffening agent such as dolomite or magnesia to a high-silica concentrate in order to reduce the fluidity. As will be apparent from the foregoing, other metal oxides such as lime, soda ash and the like may be included to establish a desired liquidity characteristics.

From the point of view of the metallizing process itself, the relatively high density of the vitrified wustite material is a definite advantage over a conventional refractory material for the operating surface of the hearth. The more heat one can store in the hearth during metallizing, the more heat can be transferred back to the bottom of the pellets as the cool "green" pellets are charged onto the hearth. The use of this high-density hearth layer results in a shortened metallizing time cycle, thus making it possible to derive a greater metallized pellet productivity from a given square foot of hearth area.

After having removed the vitrified hearth slab from the laboratory rotary hearth furnace, to make the various determinations of the properties of the slab material as heretofore described, a second two-inch thick hearth slab was formed on the rotary hearth utilizing a procedure similar to that employed in forming the initial slab. An extensive series of metallizing runs was then conducted over a period of months, to observe not only the effect on the hearth slab of continued operation but also the effect of scheduled week-end shut downs wherein the furnace was cooled down to 400° F. to 500° F. and subsequently reheated to operating temperature. It was observed that when cooled down, the hearth slab developed shrinkage cracks similar to those which occur with conventional cast monolithic refractory materials. Upon reheating to operating temperature, the shrinkage cracks closed up, again in conventional fashion. In addition to the shrinkage cracks physically closing up as the furnace is reheated, it was found that by "idling" the furnace at 2500° F. for about an hour with the hearth rotating slowly, the two-inch thick hearth slab partially liquified and in effect became truly monolithic again.

This hearth structure appears ideally suited to "heat-fast" metallizing technology wherein the high furnace temperatures of the order of 2500° F. to 2600° F. are employed, and wherein the highly reactive form of iron oxide, namely wustite (FeO), is formed on the hearth. Moreover, the high density and accompany high thermal capacity of the two-inch thick vitrified slab has indeed enabled a definite increase in the capacity of the furnace, to produce metallized pellets, to be realized, as compared to that which was possible with the earlier runs wherein lower density convectional refractories were employed.

In the aforementioned series of metallizing runs, the percentage of iron oxide in the pellets or compacts varied, i.e. in one segment of the series, the percentage of iron oxide would be different from another segment. The percentage of iron oxide in the ores from which the compacts were prepared varied from approximately 10–92%. The ores containing a low percentage of iron oxide included other metals, or oxides thereof, including silicon, magnesium, aluminum, nickel, and calcium. Those compacts having the highest percentage of iron oxide had only silica present in any appreciable quantity.

In processing the compacts of the hearth of this invention it was found that the surface of the hearth would tend to assume the character of the compacts being processed thereon. This results from the aforementioned occurrence of chips and fines falling from the compacts onto the hearth, melting and becoming part of the hearth. The hearth is doctored to maintain the same level, during which a portion of the original hearth and some of the newly deposited material is removed. Through continuous usage, the surface of the hearth will approach the composition of the compacts processed thereon, since a portion of the deposited material remains as part of the hearth. Thus the hearth surface composition may vary widely in terms of percentages of wustite, silica, and fayalite; this percentage depending upon the particular composition of the compact being metallized. Although the compacts may vary in composition relative to the hearth, no adverse effect has been found in the performance of the hearth.

In the previous example of forming the top surface layer of the hearth, a magnetite concentration containing about 4% silica was used. In light of the discovery described immediately above, another refractory hearth was made to see if the percentage of wustite in the hearth could be varied and still produce a hearth on which wustite bearing compacts could be metallized. This other hearth was formed using a laterite ore comprising approximately 25% iron oxide, 39% silica, 12% magnesium, 3% nickel, and 3% alumina and was made in the same manner as the hearth formed from magnetite with the same results. The hearth with the uppermost layer made with laterite ore was then used to metallize compacts whose composition was substantially the same as the hearth surface and equally satisfactory performance was obtained with this hearth.

The invention will now be described with reference to the accompanying drawing, in which—

Figure 1:
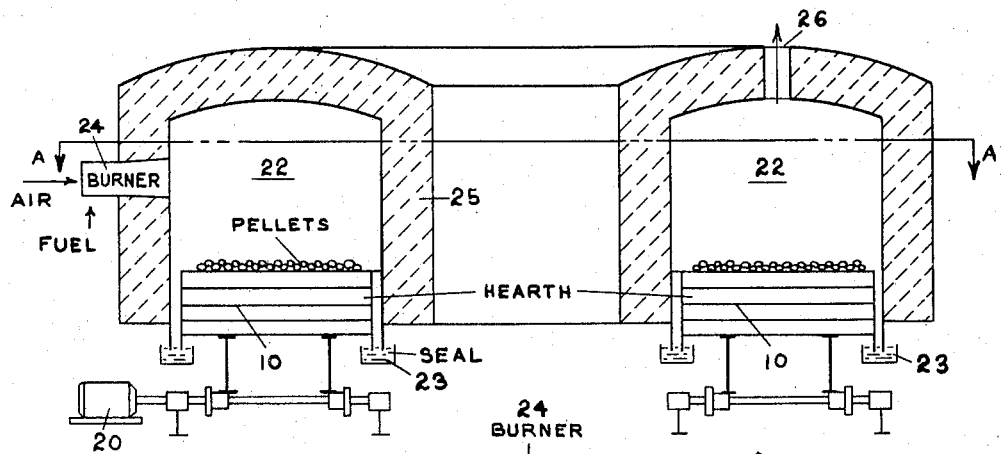
FIG. 1 is a simplified vertical sectional view of a "doughnut" type rotary hearth furnace.

As shown, the furnace includes an annular rotary hearth means 10, the same including a metal shell 11 strengthened by heat-resistant alloy retainer brackets 12. Shell 11 contains, in series, a bottom layer 13 of insulating refractory, an intermediate layer 14 of hard castable refractory, a layer 15 of high purity (e.g., 95%) MgO (either castable or prefired shapes), and a surface layer 16 of the hearth surfacing composition of the present invention.

The annular hearth is conventionally supported on rails which are, in turn, supported on wheeled members driven by any conventional driving means, e.g., by an electric motor as indicated at 20. The hearth is disposed in a "doughnut" enclosure, generally indicated at 22, and is conventionally sealed thereto as indicated by water seal 23. Suitable conventional burner means 24 are let into the vertical wall 25 of the furnace enclosure, and the enclosure is suitably vented by flue means indicated at 26.

Figure 2:
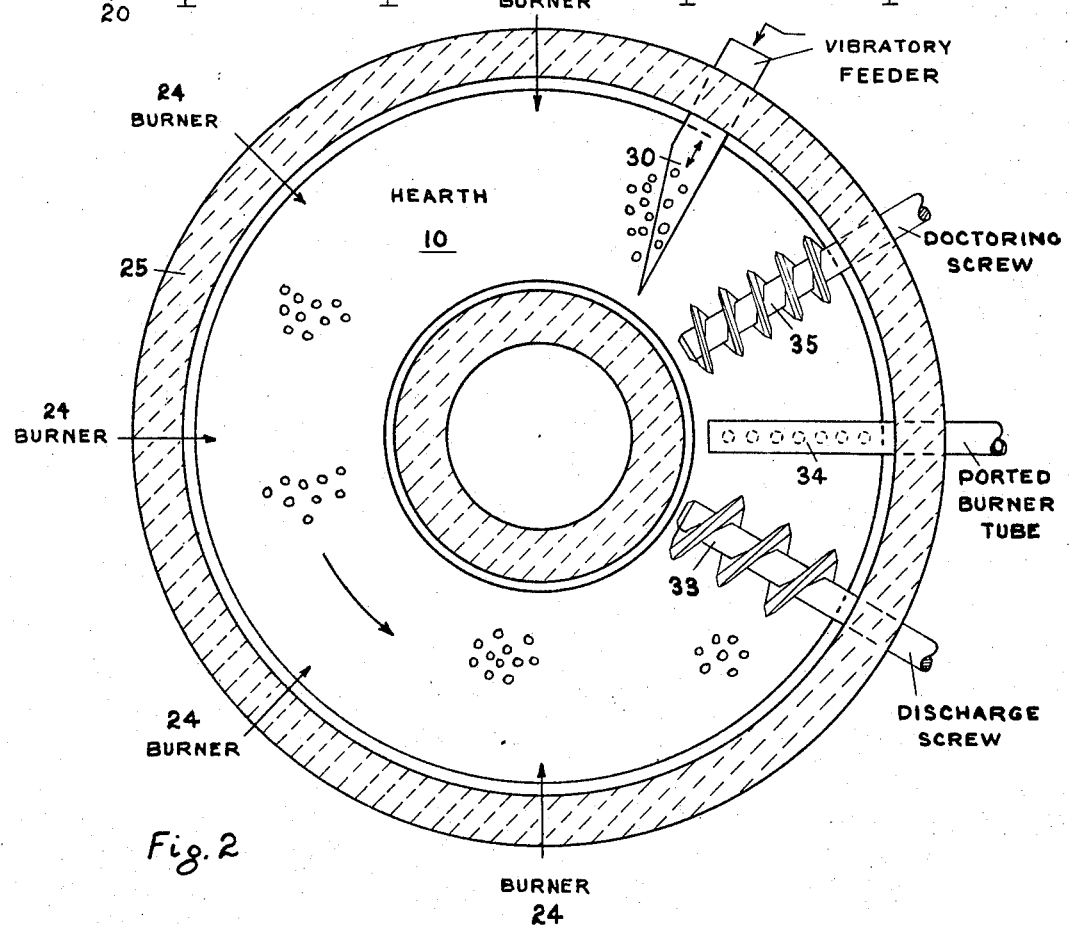
FIG. 2 is a top plan view taken on line A—A of FIG. 1.
Figure 3:
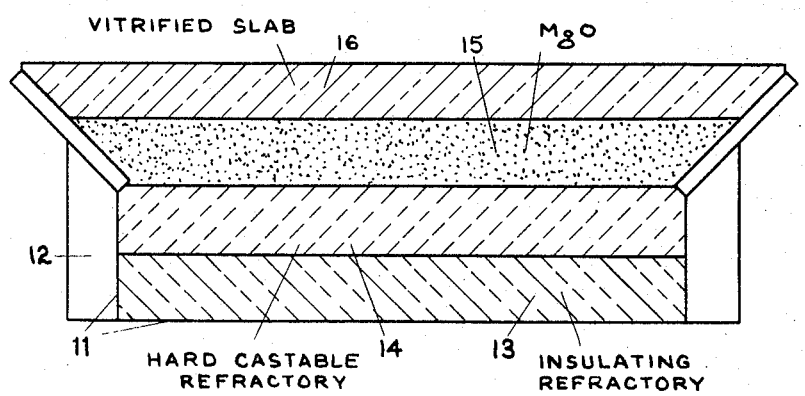
FIG. 3 is a detailed view of the hearth structure diagrammatically represented in FIG. 1.

As will appear more particularly from a consideration of FIG. 2, a plurality of spaced burners 24 are disposed in suitable ports in the furnace enclosure wall 25, by which means pre-determined temperatures, and pre-determined gas compositions issuing from the spaced burners, can be established and maintained in spaces or zones about the "doughnut" furnace.

Means for depositing "green" pellets onto the hearth are represented at 30 by a convectional feeder, such as an electric vibratory feeder, which extends through wall 25 at a suitable distance above (and as close as is practical to) the surface of the hearth. At 33 there is diagrammatically indicated a helical screw member disposed across and spaced above the hearth, which member is adapted to remove finished pellets from the hearth. A ported burner tube 34, positioned across and spaced above the hearth, is adapted to direct flames onto, and thus reheat the recently emptied hearth, and a second helical screw 35 is so positioned with respect to the surface of the hearth as to be enabled to "mill" any build-up of fines or chips off of the so-reheated hearth surface.

I claim:

1. In a furnace for the heat-processing of compacts of iron oxide-containing materials in which processing some liquid wustite (FeO) is formed, the combination comprising hearth means including a substrate; a compact-supporting surface layer, said surface layer being of sufficient thickness to prevent said liquid wustite from permeating said substrate; means for charging compacts onto said hearth; means for subjecting the compacts to an environment at a temperature of at least 2200° F.; and means for subsequently removing the compacts from the hearth, the chemical composition of at least said surface layer of said hearth having wustite (FeO) as a major constituent thereof.

2. In a furnace for the heat-processing of compacts of iron oxide-containing materials in which processing some liquid wustite (FeO) is formed, the combination comprising movable hearth means including a substrate; a compacts-supporting surface layer, said surface layer being of sufficient thickness to prevent said liquid wustite from permeating said substrate; means for charging compacts onto said hearth; means for subjecting the compacts to an environment at a temperature of at least 2200° F.; and means for subsequently removing the compacts from the hearth, the chemical composition of at least said surface layer of said hearth having wustite (FeO) as a major constituent thereof.

3. In a furnace for the heat-processing of compacts of iron oxide-containing materials in which processing some liquid wustite (FeO) is formed, the combination comprising rotary hearth means including a substrate; a compacts-supporting surface layer, said surface layer being of sufficient thickness to prevent said liquid wustite from permeating said substrate; means for charging compacts onto said hearth; means for subjecting the compacts to an environment at a temperature of at least 2200° F.; and means for subsequently removing the compacts from the hearth, the chemical composition of at least said surface layer of said hearth having wustite (FeO) as a major constituent thereof.

4. The furnace defined in claim 1, in which the chemical composition of at least the surface layer of the hearth consists essentially of wustite (FeO) and silica.

5. In a furnace for the heat-processing of compacts of iron oxide-containing materials in which processing some liquid wustite (FeO) is formed, the combination comprising hearth means includng a substrate; a compacts-supporting surface layer, said surface layer being of sufficient thickness to prevent said liquid wustite from permeating said substrate; means for charging compacts onto said hearth; means for subjecting the compacts to an environment at a temperature of at least 2200° F.; means for subsequently removing the compacts from the hearth, and means for doctoring off of the surface of said hearth means any build-up of fines derived from said compacts, the chemical composition of at least said surface layer of said hearth having wustite (FeO) as a major constituent thereof.

6. The furnace defined in claim 5, in which said doctoring means comprises a helical screw.

7. The furnace defined in claim 5, in which a hearth-reheat means is interposed between said compacts-removing means and said doctoring means.

8. The furnace defined in claim 7, in which a ported burner directed at said hearth means constitutes said hearth-reheat means.

9. The furnace defined in claim 1, in which said surface layer of said hearth means overlays a supporting layer of refractory material, a major portion of which is MgO.

10. In a furnace for the heat-processing of compacts of iron oxide-containing materials in which processing some liquid wustite (FeO) is formed, the combination comprising hearth means including a substrate; a compact-supporting surface layer, said surface layer being of sufficient thickness to prevent said liquid wustite from permeatnig said substrate; means for charging compacts onto said hearth; means for subjecting the compacts to an environment at a temperaure of at least 2200° F.; and means for subsequently removing the compacts from the hearth, the chemical composition of at least said surface layer of said hearth having wustite (FeO) as a constituent thereof.

11. The furnace of claim 10 wherein the chemical composition of at least the surface layer of said hearth comprises 10–30% iron oxide, 35–45% silica, and 2–4% nickel.

12. The furnace of claim 10 wherein the chemical composition of at least the surface of said hearth comprises 10–30% iron oxide, 35–45% silica, 2–4% nickel, 10–15% magnesia, and 2–4% alumina.

13. A refractory furnace hearth, having iron oxide in the wustite (FeO) state as a constituent thereof.

References Cited

UNITED STATES PATENTS

| | | | |
|---|---|---|---|
| 213,353 | 3/1879 | Siemens | 75—95 |
| 279,157 | 6/1883 | Henderson | 75—95 |
| 2,917,298 | 12/1959 | Kendall | 263—28 |

FOREIGN PATENTS

| | | |
|---|---|---|
| 567,289 | 12/1923 | France. |

J. SPENCER OVERHOLSER, *Primary Examiner.*

R. S. ANNEAR, *Assistant Examiner.*

U.S. Cl. X.R.

263—28; 264—30